United States Patent [19]
King

[11] Patent Number: 5,395,020
[45] Date of Patent: Mar. 7, 1995

[54] STORAGE CARRIER FOR WHEELCHAIRS AND SCOOTERS

[76] Inventor: Joseph A. King, 8925 St. Rd. 43 North, Battleground, Ind. 47920

[21] Appl. No.: 905,451

[22] Filed: Jun. 29, 1992

[51] Int. Cl.⁶ ............................................... B60R 9/00
[52] U.S. Cl. .......................... 224/42.43; 224/42.03 A; 224/42.07
[58] Field of Search ............... 224/42.03 R, 42.03 A, 224/42.03 B, 42.07, 42.08, 42.43, 42.44, 42.45 R

[56] References Cited

U.S. PATENT DOCUMENTS

| | | | |
|---|---|---|---|
| 3,913,811 | 10/1975 | Spencer | 224/42.08 |
| 4,593,840 | 6/1986 | Chown | 224/42.03 |
| 4,705,448 | 11/1987 | Mungons | 414/462 |
| 4,813,584 | 3/1989 | Wiley | 224/42.44 |
| 4,844,528 | 7/1989 | Johnson | 296/37.1 |
| 4,906,015 | 3/1990 | Lacroix et al. | 224/42.07 |
| 4,971,509 | 11/1990 | Sechovec | 414/462 |
| 5,011,361 | 4/1991 | Peterson | 414/462 |
| 5,018,651 | 5/1991 | Hull et al. | 224/42.44 |
| 5,029,740 | 7/1991 | Cox | 224/42.01 |
| 5,033,662 | 7/1991 | Godin | 224/42.430 |
| 5,067,640 | 11/1991 | Gaskill | 224/42.07 |
| 5,106,002 | 4/1992 | Smith et al. | 224/42.03 A |
| 5,199,842 | 4/1993 | Watt et al. | 224/42.03 R |

*Primary Examiner*—Linda J. Sholl
*Attorney, Agent, or Firm*—Varnum, Riddering, Schmidt & Howlett

[57] ABSTRACT

A carrier that is cantilevered from the trailer hitch of a motor vehicle includes a solid tongue that telescopically engages the trailer hitch and a hollow tube having a leading end that is secured to the trailing end of the solid tongue. About one-fifth the weight of the container is supported by the solid tongue, and about four-fifths of its weight is supported by the hollow tube. Gusset plates maintain the hollow tube at a slightly inclined angle with respect to the solid tongue so that the apparatus does not drag the road surface when bumps are encountered. In a second embodiment, the hollow tube is spaced above the solid tongue and the container sits atop the hollow tube. However, about one-fifth of the solid tongue is positioned below the hollow tube to support it and the container. In both embodiments, transverse frame members are secured to the tongue and tube, and in the second embodiment, longitudinal frame members interconnect opposite ends of the transverse frame members to further strengthen the carrier frame. The frame supports a box-like container having a lockable lid, and one side wall of the container is hinged to provide a ramp that allows a wheelchair to enter or exit the container when the side wall is swung open. An auxiliary ramp is used when a scooter is on or off-loaded.

1 Claim, 5 Drawing Sheets

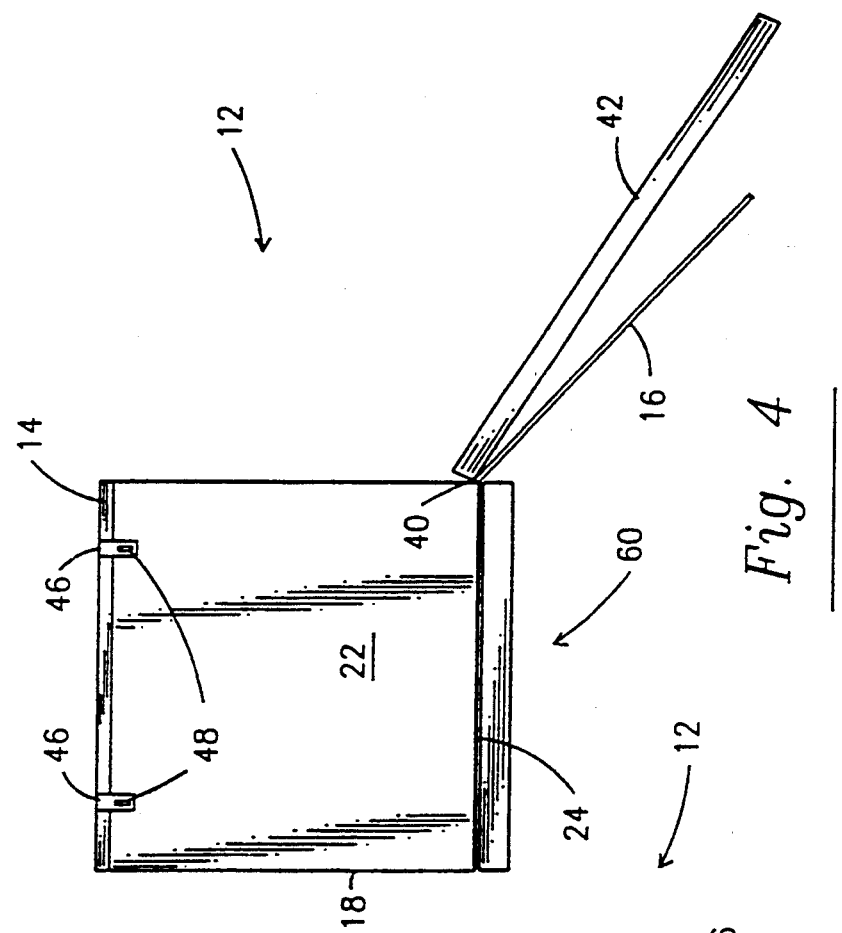
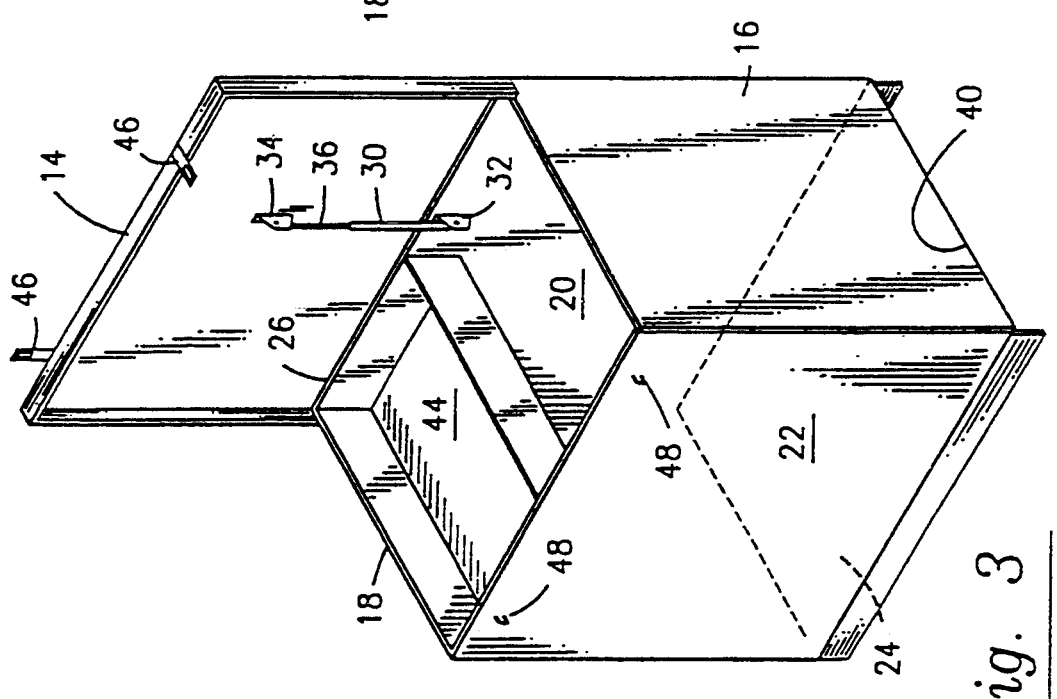

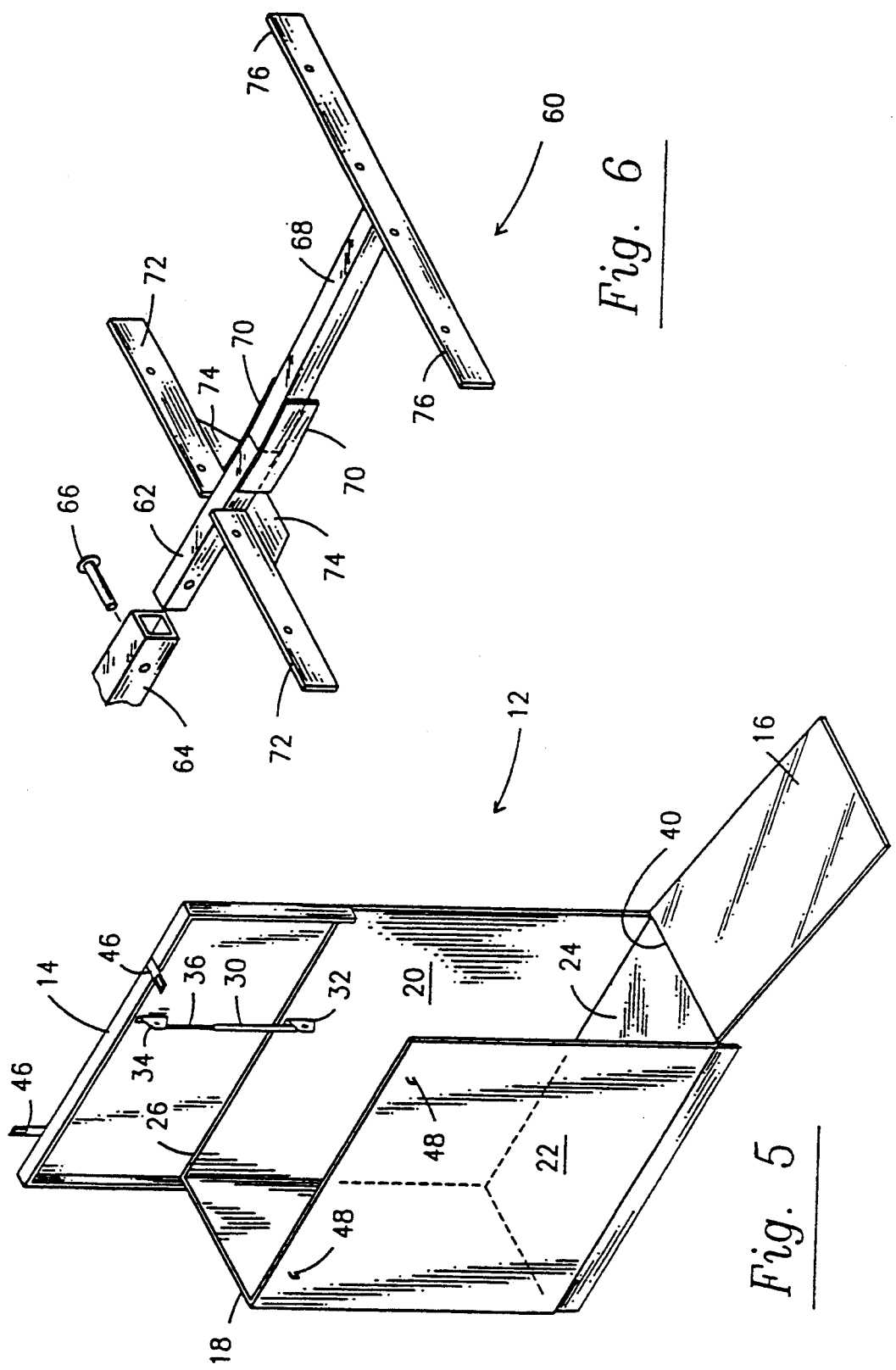

STORAGE CARRIER FOR WHEELCHAIRS AND SCOOTERS

BACKGROUND OF THE INVENTION

1. Technical Field

This invention relates, generally, to carrier devices used to transport nonroad vehicles over public road. More particularly, it relates to a carrier that is attached to the rear of a vehicle of the type licensed for operation on public highways.

2. Description of the Prior Art

The most common tool for transporting nonroad vehicles over public highways is the trailer; however, trailers have road-contacting wheels and therefore must be licensed for highway operation.

Accordingly, inventors have developed carriers that are cantilevered from the transporting vehicle so that no road-contacting wheels and hence no license is required for such carriers.

U.S. Pat. No. 5,067,640 to Gaskill, for example, shows a universal carrier that is cantilevered from the trailer hitch of the transporting vehicle. Additional cantilevered cargo carriers are shown in U.S. Pat. Nos. 4,813,584 to Wiley, 3,913,811 to Spencer, 4,705,448 to Mungons, 5,029,740 to Cox, 5,011,361 to Peterson, and 4,593,840 to Chown. Of these designs, only Chown shows a covered carrier; however, it includes no means for loading a heavy nonroad vehicle such as a scooter thereinto.

Another cantilevered design, but one which requires a pair of laterally spaced apart trailer hitches, is shown in U.S. Pat. No. 5,033,662 to Godin.

A covered, rear mounted storage trunk is shown in U.S. Pat. No. 4,844,528 to Johnson, but it is mounted to the rear bumper of the vehicle, i.e., not to a trailer hitch.

Although these devices perform their intended functions, they provide no means for protecting the transported vehicle from the elements or from theft. Flexible cloth covers have been designed to fit over the transported vehicles, but such covers must be custom made to fit the particular item being covered, are somewhat unsightly, and provide no protection against theft.

Some of the earlier devices provide insubstantial support for the carrier itself; these devices have been know to bump the road surface when the transporting vehicle encounters uneven road surfaces. Other devices do not bump the road because they are sturdily built; however, these devices are heavy and thus expensive to transport. Moreover, they require large amounts of materials and thus are expensive to manufacture.

What is needed, then is a carrier that protects the transported vehicle from the elements and from theft, that is built so that it does not bottom out even when transported over uneven roads at high speeds, and which is made of a small amount of lightweight materials without loss of strength. However, the prior art, when considered as a whole in accordance with the requirements of law, neither taught nor suggested to those of ordinary skill in this art, at the time the present invention was made, how the needed structure could be provided.

SUMMARY OF THE INVENTION

The longstanding but heretofore unfulfilled need for a small vehicle carrier that protects the carried vehicle and which is made of a simple yet rugged construction is now provided in two embodiments. A first embodiment transports a wheelchair, and the second embodiment transports a rechargeable electric scooter of the type normally employed by the handicapped. Both embodiments may be used to carry other items as well, without limitation. For example, both embodiments may carry camping equipment, groceries, or any other goods of the type suitable for transportation in a container of the type disclosed hereinafter.

Both embodiments include a support frame for supporting a container, and the containers of both embodiments are essentially the same, except for their respective sizes. Thus, the primary differences between the two embodiments lie in their respective frame construction.

Both support frames include a common design element, i.e., both frames include a solid, longitudinally disposed horizontal bar that telescopically engages a conventional trailer hitch, and a hollow, slightly upwardly inclined support bar that is fixedly secured to the solid bar in longitudinal alignment therewith. In both embodiments, the inclination of the hollow support bar helps prevent the carrier from bottoming out when it is transported over uneven surfaces at high speeds.

Both support frames also include a pair of longitudinally spaced apart, transversely disposed frame members that are supported by the longitudinally disposed bars.

The wheelchair support frame, however, includes only the longitudinal bars and the pair of transverse frame members, whereas the scooter embodiment adds a pair of additional longitudinally disposed frame members that interconnect opposite ends of the transversely disposed frames; the scooter embodiment also adds additional support means along the length of the main longitudinal support bars.

Both embodiments include containers with four walls, one of which is hingedly mounted so that it may be swung open and out of the way when a small vehicle is being loaded into the container. Each novel container is also provided with a hingedly mounted cover or lid that is opened and held open by a cylinder means during the loading process.

It is therefore clear that the primary object of the present invention is to provide a nonroad vehicle carrier attachable in cantilevered fashion to the rear of a road vehicle that protects the carried vehicle from the elements and from theft.

Another important object is to provide a carrier having a strength that matches the strength of the heavier carriers heretofore known but which requires less materials to fabricate so that it is less expensive to manufacture, more affordable to consumers, and lighter in weight so that it can be supported by the most common light duty hitches and cars and does not bottom out when transported over uneven surfaces. This must be accomplished while maintaining a totally bolt together design so that in case of a minor accident any one panel can be replaced by merely unbolting the damaged panel and bolting the new panel in place.

These and other important objects, features and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 3 is a perspective view showing the cylinder that holds the lid of the container open and the auxiliary tray means;

FIG. 4 is a front elevational view of the container when a sidewall is swung open so that ramps can be used to lead a scooter into the container;

FIG. 5 is a perspective view similar to FIG. 3 but showing a sidewall of the container swung open so that a wheelchair may be loaded or unloaded;

FIG. 6 is a perspective view of the frame for the wheelchair embodiment;

Similar reference numerals refer to similar parts throughout the several views of the drawings.

DETAILED DESCRIPTION OF THE PREFERRED EMBODIMENT

Figure 1:
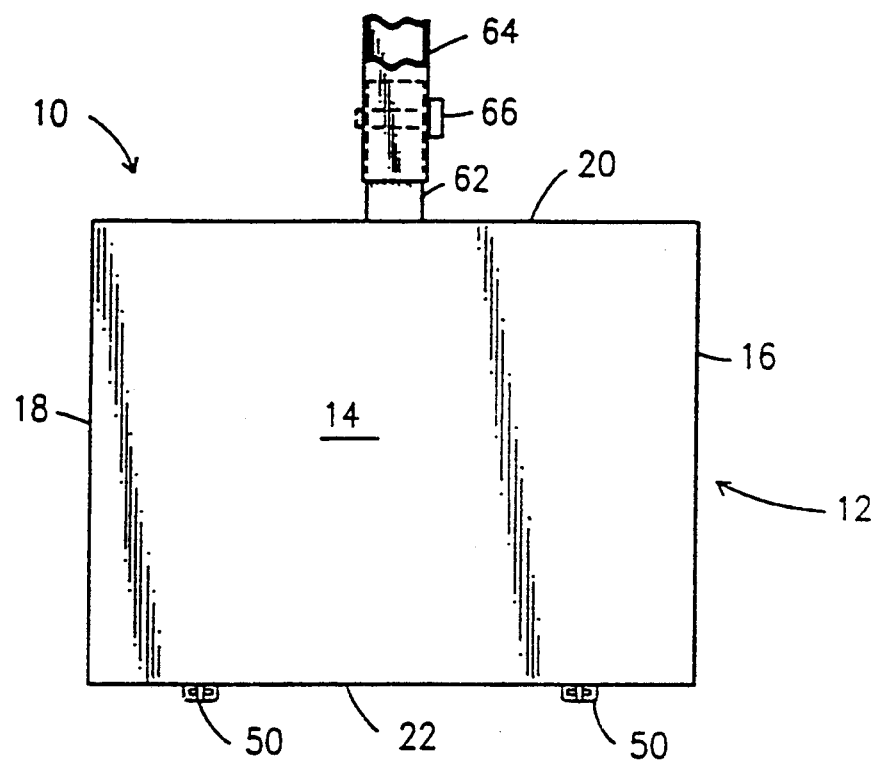
FIG. 1 is a top plan view of an illustrative embodiment of the invention.
Figure 2:
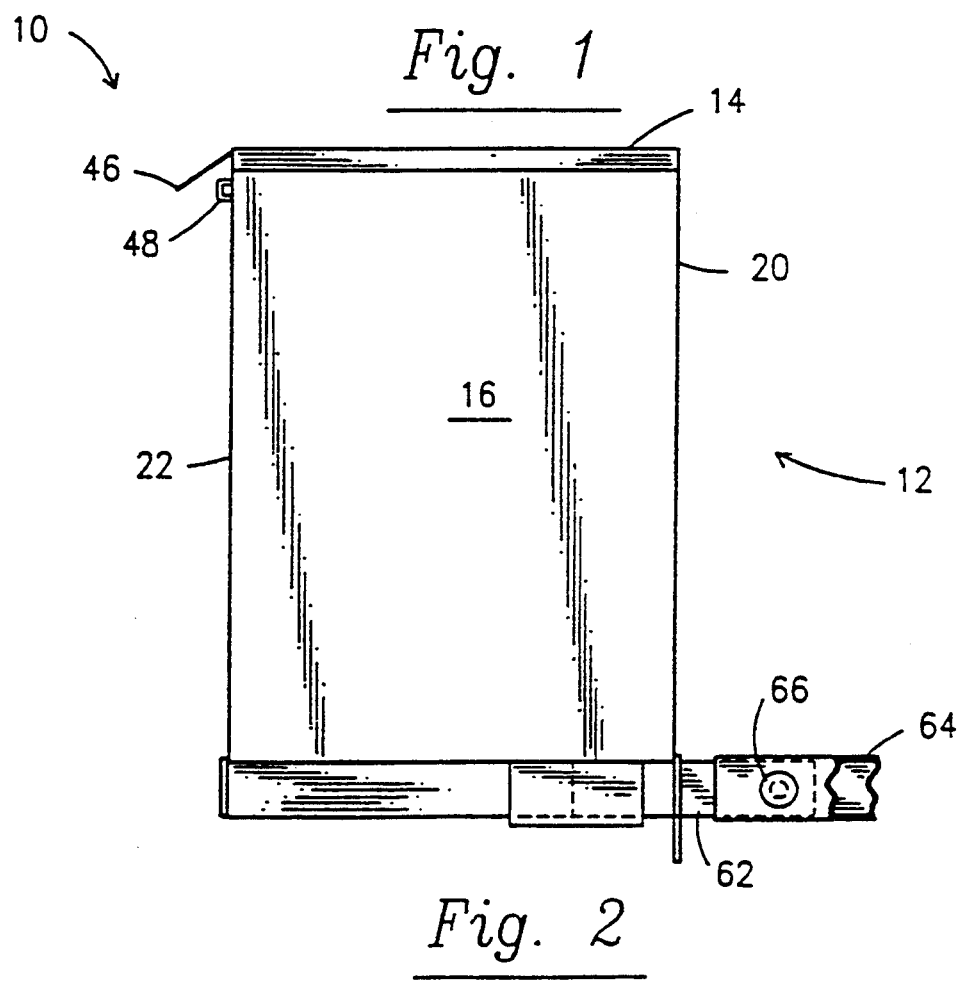
FIG. 2 is a side elevational view of the parts shown in FIG. 1.

Referring now to FIGS. 1-3, it will there be seen that an illustrative embodiment of the present invention is denoted as a whole by the reference numeral 10.

Container 12 includes hingedly mounted lid 14, longitudinally disposed, transversely spaced apart side walls 16, 18, transversely disposed, longitudinally spaced apart front and back walls 20, 22, and bottom wall 24. Hinge means 26 interconnects the leading edge of top wall or lid 14 to the uppermost edge of front wall 20; lid 14 is opened when a scooter or wheelchair is being loaded into container 12.

Cylinder means 30 is mounted by a suitable bracket 32 to the interior side of front wall 20, and its distal free end is mounted to the underside of top wall or lid 14 by a suitable bracket 34. Thus, lid 14 is opened when plunger 36 of cylinder 30 is extended as shown in FIG. 3, and said lid is held open as long as said rod remains extended.

Another hinge 40 is disposed in interconnecting relation between the lowermost edge of side wall 16 and the contiguous edge of bottom wall 24 so that side wall 16 may be swung into the position shown in FIG. 4. When in this lowered position, side wall 16 does not interfere with the vehicle loading operation, as is clear from FIG. 4. Note the use of ramps 42 which are required when a heavy scooter is being on or off-loaded; when the ramps are not in use, they are stored in the container 12 along with the wheelchair, scooter, or other goods.

FIG. 3 shows a tray 44 which may be used to hold items such as wheelchair footplates; the tray is secured to the container interior walls by any suitable means. A pair of laterally spaced hasps 46 are pivotally secured to the trailing edge of lid 14; these hasps interconnect with cooperatively positioned lock members 48 fixedly secured to rear wall 22 when the lid is closed and said lid is locked in said closed position with padlock members 50 as shown in FIG. 1.

The container 12 for a foldable wheelchair (FIG. 5) has a truncate longitudinal extent visa vis the container for a scooter or nonfoldable wheelchair (FIGS. 1-4). However, the respective containers for wheelchairs, foldable wheelchairs, and scooters are the same in all other respects, except that ramps 42 need not be employed during the on or off-loading of wheelchairs. As shown in FIG. 5, sidewall 16 serves as the ramp means for wheelchairs. The means for supporting said containers differs, however, because scooters are heavier than wheelchairs and require stronger support.

Figure 7:
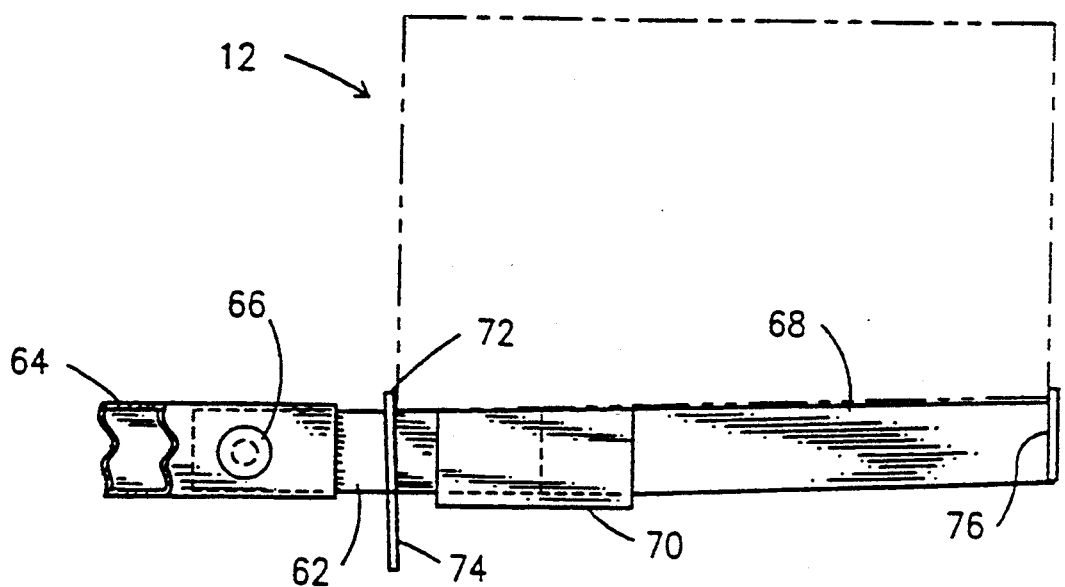
FIG. 7 is a side elevational view of the frame shown in FIG. 6.

The support structure for the wheelchair container will be described first. As shown in FIGS. 6 and 7, wheelchair support frame 60 includes an elongate, longitudinally disposed, solid, rectangular in transverse section tongue 62 that slideably engages a conventional trailer hitch 64. Tongue 62 is transversely bored to receive a pin 66 that locks it into position relative to trailer hitch 64. Since tongue 62 is heavy, an important feature of this invention is the preselected longitudinal extent thereof; it extends under and only about twenty per cent (20%) of container 12, as will be made more clear hereinafter.

Fixedly secured to solid tongue 62 in longitudinal alignment therewith and abutting relation thereto is hollow support tube 68. Support tube 68 is substantially lighter in weight than solid tongue 62; and extends under about eighty per cent (80%) of container 12. Support tube 68 is inclined upwardly, relative to horizontal trailer hitch 64, at a preselected angle. In a preferred embodiment, the angle is about one and one-half degrees; it is believed that the angle should not exceed five degrees. A pair of longitudinally disposed gusset plates, collectively denoted 70, secure the solid tongue and hollow tube to one another, i.e., a leading end of each gusset plate is fixedly secured by welding to the trailing end of solid tongue 62 and a trailing end of each gusset plate is welded to the leading end of hollow tube 68. Thus, gusset plates 70 bridge said abutting members and secure them against relative movement therebetween.

A pair of transversely disposed forward frame members, collectively denoted 72, extend from opposite sides of solid tongue 62 and are fixedly secured thereto. A transversely disposed support plate 74 is positioned below solid tongue 62 and performs the function its name implies, i.e., it interconnects and supports said forward frame members 72.

A transversely disposed rear frame member 76 is fixedly secured to the trailing end of hollow tube 68; since it is a single piece, it does not require central support of the type provided by support plate 74 to the forward frame members 72.

Note in FIG. 7 that the leading one-fifth part of container 12 extends over solid tongue 62 and that the balance thereof extends over hollow tube 68.

This completes the description of the wheelchair embodiment. The structural simplicity of wheelchair support frame 60 was heretofore unknown. Moreover, the novel use of a solid tongue and a hollow tube as the central support means for a container was also heretofore unknown, as was the limited longitudinal extent of the solid tongue and other features such as the angular relation between said novel elements.

Figure 8:
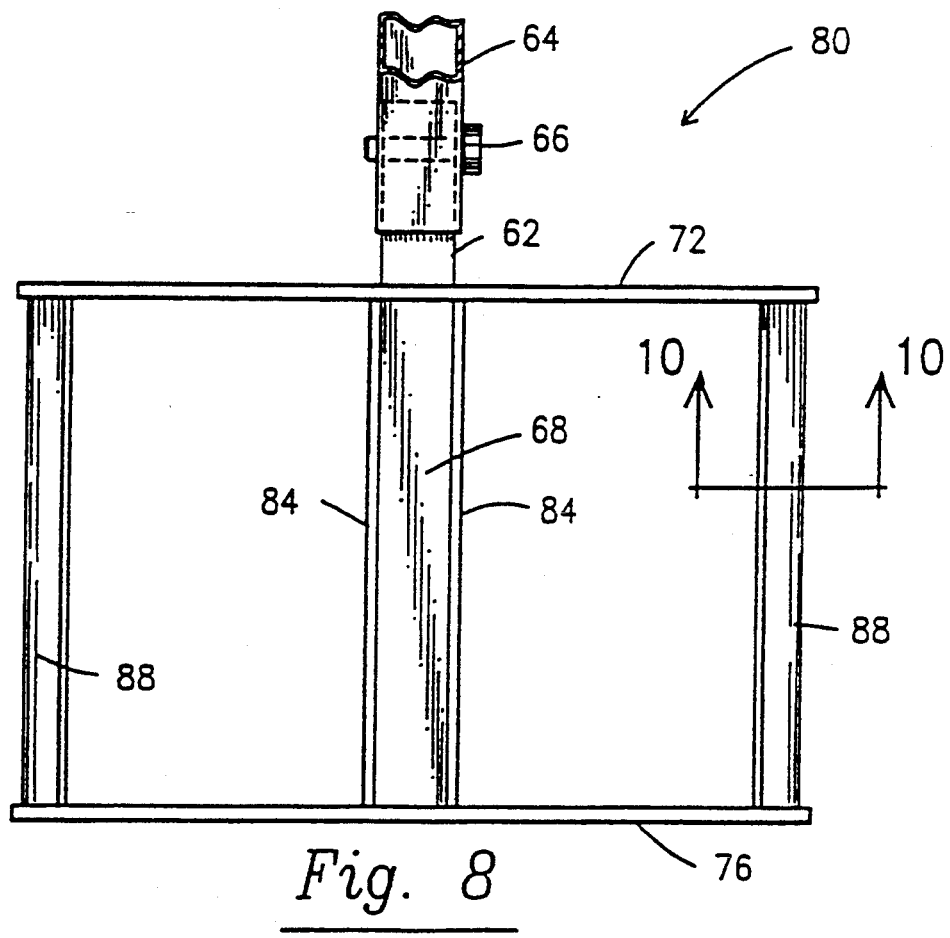
FIG. 8 is a top plan view of the frame for the scooter-carrying embodiment.
Figure 9:
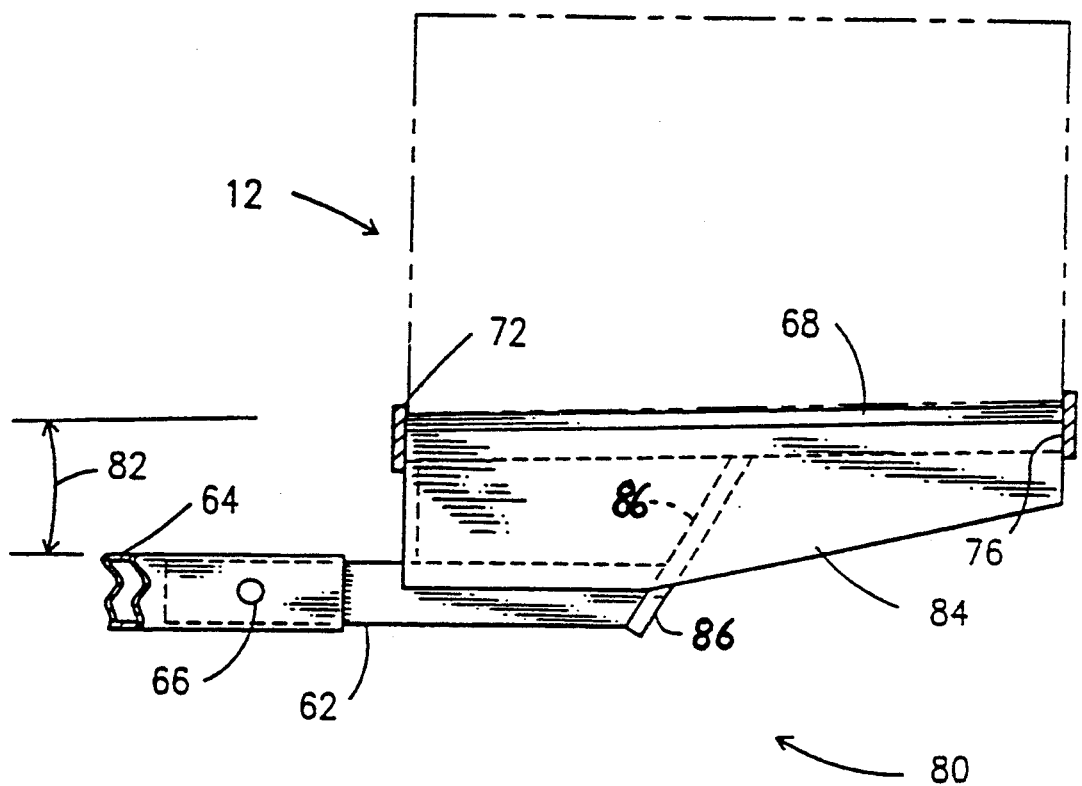
FIG. 9 is a side elevational view of the frame shown in FIG. 8.
Figure 10:
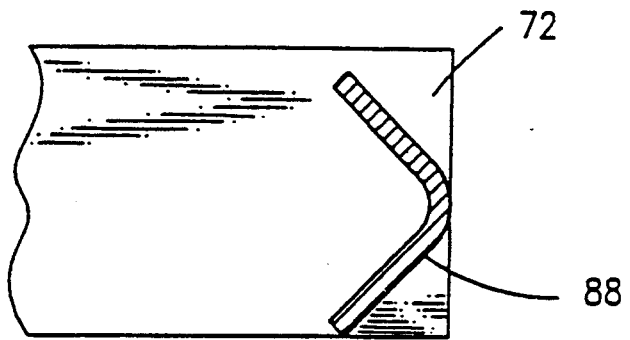
FIG. 10 is a sectional view taken along line 10—10 in FIG. 8.

The frame for supporting the scooter container is shown in FIGS. 8-10, and is denoted 80 as a whole. In this embodiment, solid tongue 62 and hollow tube 68 do not abut one another in the end-to-end manner of the wheelchair embodiment. However, they are still in longitudinal alignment with one another and the trailer hitch of the towing vehicle. More particularly, as shown in FIG. 9, hollow tube 68 is spaced upwardly of solid tongue 62, and is disposed at a preselected angle 82 with respect thereto. In the preferred embodiment, angle 82 is about four degrees. The angular relation between tongue 62 and tube 68 is maintained in part by a pair of elongate gusset plates 84; note that said plates 84 extend the entire length of tube 68. Said angular relation is further maintained by a pair of stiffeners, collectively denoted 86, that extend between said tongue and tube at the angle shown in the drawings. Both the gusset plates 84 and the stiffeners 86 are positioned on opposite sides of said tongue and tube, and are fixedly secured in their respective positions by suitable means such as welds.

A transversely disposed forward frame member 72 and a transversely disposed rearward frame member 76 are fixedly secured to the leading and trailing ends of tube 68, respectively. Unlike forward frame member 72 of the wheelchair embodiment, member 72 of this embodiment is a single piece. The opposite ends of members 72 and 76 are interconnected by longitudinally disposed interconnecting members, collectively denoted 88 in FIG. 8; as shown in FIG. 10, each interconnecting member 88 has an "L"-shaped cross section and is oriented with respect to frame members 72 and 76 such that its walls are disposed at forty five degree angles relative to a horizontal plane.

In this way, an exceptionally strong, yet light in weight support means is provided for a container of the size capable of holding a scooter therein. Note in FIG. 9, as in the wheelchair embodiment, that the solid tongue 62 extends below only the leading twenty per cent (20%) of the container. However, whereas in the wheelchair embodiment the hollow tube 68 extended beneath only eighty per cent (80%) of the container, in this scooter embodiment said hollow tube 68 extends the entire length of said container. Thus, the container has a double support.

This invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A carrier attachable in cantilevered relation to a trailer hitch for transporting goods over public highways, comprising:

a support frame;

said support frame including a longitudinally disposed solid tongue having a leading end disposed in fixed telescoping relation to said trailer hitch;

said support frame including a longitudinally disposed hollow tube having a leading end fixedly secured in abutting relation to a trailing end of said solid tongue so that said solid tongue and hollow tube are disposed in end-to-end relation to one another;

said support frame including a first, transversely disposed leading frame means for supporting a container and a second, transversely disposed trailing frame member disposed in longitudinally spaced relation to said first frame means, said first frame means being supported by said solid tongue and said second frame member being supported by said hollow tube;

said first frame means formed by a pair of transversely disposed frame members fixedly secured to opposite sides of said solid tongue, and comprising a support plate positioned below said solid tongue and interconnecting said first frame members to one another and to said solid tongue;

said hollow tube being disposed at a predetermined, upwardly inclined angle relative to said solid tongue;

open-topped container means supported by said support frame for transporting goods within; and a closure means for selectively closing said container means so that goods disposed within said container means are protected from the elements when said closure means is closed.

* * * * *